(12) United States Patent
Lee et al.

(10) Patent No.: US 11,154,044 B2
(45) Date of Patent: Oct. 26, 2021

(54) INSECT TRAP

(71) Applicant: Seoul Viosys Co., Ltd., Ansan-si (KR)

(72) Inventors: Chung Hoon Lee, Ansan-si (KR); Mi So Ko, Ansan-si (KR); Eun Mi Choi, Ansan-si (KR)

(73) Assignee: Seoul Viosys Co., Ltd., Ansan-si (KR)

( * ) Notice: Subject to any disclaimer, the term of this patent is extended or adjusted under 35 U.S.C. 154(b) by 300 days.

(21) Appl. No.: 16/193,864

(22) Filed: Nov. 16, 2018

(65) Prior Publication Data
US 2019/0313619 A1 Oct. 17, 2019

Related U.S. Application Data

(63) Continuation of application No. PCT/KR2017/005165, filed on May 18, 2017.

(30) Foreign Application Priority Data

| May 18, 2016 | (KR) | .................. 10-2016-0061015 |
| Jun. 2, 2016 | (KR) | .................. 10-2016-0068564 |
| May 17, 2017 | (KR) | .................. 10-2017-0061191 |

(51) Int. Cl.
*A01M 1/06* (2006.01)
*A01M 1/08* (2006.01)
(Continued)

(52) U.S. Cl.
CPC ............... *A01M 1/08* (2013.01); *A01M 1/06* (2013.01); *A01M 1/02* (2013.01); *A01M 1/10* (2013.01); *A01M 2200/012* (2013.01)

(58) Field of Classification Search
CPC ............ A01M 1/02; A01M 1/06; A01M 1/08; A01M 1/10
(Continued)

(56) References Cited

U.S. PATENT DOCUMENTS

| 3,128,938 A | * | 4/1964 | Ariewitz | .................. F24F 11/74 |
| | | | | 415/148 |
| 2008/0073287 A1 | * | 3/2008 | Kolber | ....................... A61L 2/10 |
| | | | | 222/1 |

(Continued)

FOREIGN PATENT DOCUMENTS

| JP | 5568546 | 8/2014 |
| KR | 10-2009-0009373 | 1/2009 |

(Continued)

OTHER PUBLICATIONS

International Search Report dated Jul. 26, 2017, in International Application No. PCT/KR2017/005165 (with English Translation).

*Primary Examiner* — Claude J Brown
(74) *Attorney, Agent, or Firm* — H.C. Park & Associates, PLC

(57) ABSTRACT

An insect trap to entice and collect insects with UV light, and including a main body, a cross-fan, an insect filter, an insect collector detachably provided to the cross-fan, and a decoy UV LED installation unit coupled to a buttress above the main body and including a decoy UV LED module, in which the main body has an inlet port and a flow channel having an inclined shape and a curved shape extending from the inclined shape, the insect collector including an insect collector mesh through which air introduced into the main body is discharged, the decoy UV LED module includes at least one chip-on-board type UV LED chip or at least one UV LED package mounted on a support substrate, and the insect filter is detachably coupled to the inlet port and allows selective passage of insects therethrough.

20 Claims, 16 Drawing Sheets

(51) Int. Cl.
*A01M 1/10* (2006.01)
*A01M 1/02* (2006.01)

(58) Field of Classification Search
USPC .......................................................... 43/139
See application file for complete search history.

(56) References Cited

U.S. PATENT DOCUMENTS

| | | | | |
|---|---|---|---|---|
| 2009/0277074 | A1* | 11/2009 | Noronha | A01M 1/08 43/113 |
| 2012/0171945 | A1* | 7/2012 | Lee | A01M 29/18 454/237 |
| 2014/0137462 | A1* | 5/2014 | Rocha | A01M 1/08 43/113 |
| 2015/0357532 | A1* | 12/2015 | Onuma | A01G 9/249 257/98 |
| 2016/0174539 | A1* | 6/2016 | Lee | A01M 1/08 43/112 |

FOREIGN PATENT DOCUMENTS

| | | |
|---|---|---|
| KR | 10-0924074 | 11/2009 |
| KR | 10-1253467 | 4/2013 |
| KR | 10-2013-0058992 | 6/2013 |

* cited by examiner

INSECT TRAP

CROSS REFERENCE TO RELATED APPLICATIONS

This application is a Bypass Continuation of International Patent Application No. PCT/KR2017/005165, filed on May 18, 2017, and claims priority from and the benefit of Korean Patent Application No. 10-2016-0061015, filed on May 18, 2016, Korean Patent Application No. 10-2016-0068564, filed on Jun. 2, 2016, and Korean Patent Application No. 10-2017-0061191, filed on May 17, 2017, which are hereby incorporated by reference for all purposes as if fully set forth herein.

TECHNICAL FIELD

Embodiments of the present disclosure relate to an insect trap, and more particularly, to an insect trap that collects insects by enticing the insects with decoy light and suctioning the enticed insects using an air stream generated by a suction fan.

BACKGROUND ART

Recently, harmful insects have increased in number due to change of climate conditions such as global warming and social policies such as eco-friendly policies. Harmful insects cause not only damage to crops and livestock, but also have a negative influence on people by transmitting pathogenic bacteria, such as malaria, dengue, Japanese encephalitis, and the like. Particularly, studies on a mosquito insecticide method have been actively carried out due to spread of infection fear of zika virus (ZIKV).

Conventional insecticidal methods include a chemical pest control method using an insecticide, a biological pest control method using mudfish and the like, a physical pest control method using a black light trap and carbon dioxide that entices the harmful insects to kill harmful insects through application of high voltage, and an environmental pest control method such as removal of puddles or removal of environments favorable to insect larvae. However, the chemical pest control method can cause secondary contamination, the biological pest control method or the environmental pest control method is expensive, time consuming and labor intensive, and the physical pest control method using an insecticide or insect trap has a problem of user inconvenience due to a complicated configuration of the trap or provides danger due to use of a high voltage device.

On the other hand, a UV light source is used for various purposes such as medical purposes including sterilization and disinfection, analysis purposes based on variation in intensity upon irradiation of UV light, industrial purposes such as UV curing, beauty treatment such as UV tanning, insect collection, identification of counterfeit notes, and the like. Examples of typical UV lamps used as the UV light source include a mercury lamp, an excimer lamp, a deuterium lamp, and the like. However, such typical lamps have problems of high power consumption and heat generation, short lifespan, and environmental pollution due to toxic gas supplied to the lamps.

In order to address the problems of the aforementioned typical UV light sources, a UV light emitting device (LED) has been spotlighted due to various merits including low power consumption and no environmental pollution. Accordingly, some studies are focused on development of an insect trap configured to collect insects using a suction fan after enticing the insects using decoy light.

However, such an insect trap configured to collect insects using the suction fan after enticing the insects using a typical UV LED has problems such as noise generation by a suction fan due to attachment of dead insects such as mosquitoes to the suction fan, escape of mosquitoes from the insect trap or insufficient suctioning of mosquitoes into the insect trap due to difficulty in speed control of the suction fan, and low suction efficiency or high power consumption due to difficulty in control of an air stream generated by the insect trap.

DISCLOSURE

Technical Problem

Embodiments of the present disclosure provide an insect trap that is eco-friendlier, provides a more convenient manufacturing process, and secures efficiency in enticing and suctioning of insects.

Embodiments of the present disclosure provide an insect trap that can generate a suitable air stream velocity for suctioning mosquitoes while minimizing noise.

Embodiments of the present disclosure provide an insect trap that is provided with a decoy UV LED module having high efficiency in enticement of mosquitoes and emitting light having wavelengths and intensity harmless to humans.

Embodiments of the present disclosure provide an insect trap that is provided with an insecticidal UV LED module having high efficiency in extermination of collected mosquitoes.

Technical Solution

In accordance with one embodiment, there is provided an insect trap adapted to entice and collect insects with UV light, the insect trap including: a main body; a cross-fan mounted inside the main body; an insect collector detachably provided to a lower side of the cross-fan and collecting insets; and a decoy UV LED installation unit coupled to a buttress above the main body and provided with a decoy UV LED module, wherein the main body has an inlet port defined by a space open at an upper side thereof and a cross-section of the main body corresponding to a facet of the cross-fan on which fan blades of the cross-fan move upwards with reference to a rotation direction of the cross-fan defines a first flow channel and a second flow channel extending perpendicularly from the first flow channel to the insect collector, the first flow channel being composed of an inclined shape gradually narrowed downwards from the inlet port and a curved shape extending in an arc shape from a lower end of the inclined shape.

In one embodiment, the second flow channel may have a narrower width than the first flow channel.

In one embodiment, the cross-fan may include 20 to 40 fan blades and may be adapted to rotate at a rotation speed of 2,000 rpm to 3,500 rpm.

In one embodiment, an air stream generated by the cross-fan has a speed of 0.5 m/s to 3 m/s in a region having an area four times that of the inlet port with respect to the same center as the inlet port at a height of 20 mm from the inlet port.

In one embodiment, the insect collector may include an insect collector mesh through which air introduced into the main body by the cross-fan is discharged.

In one embodiment, the insect collector mesh may include orifices having a diameter of 1 mm to 3 mm.

In one embodiment, the decoy UV LED module may be detachably coupled to the decoy UV LED installation unit.

In one embodiment, the decoy UV LED installation unit may be rotatably coupled to the buttress so as to allow control of a light emission direction of the decoy UV LED module.

In one embodiment, the decoy UV LED installation unit may be provided with a transparent decoy UV LED module cover formed corresponding to the decoy UV LED module and protecting the decoy UV LED module.

In one embodiment, the decoy UV LED module may emit light having a wavelength of 340 nm to 390 nm.

In one embodiment, the decoy UV LED module may have a light output of 800 mW to 1,500 mW upon application of a voltage of 10 V to 15 V and an input current of 72 mA to 100 mA.

In one embodiment, the decoy UV LED module may include at least one chip-on-board (COB) type UV LED chip or at least one UV LED package mounted on a support substrate.

In one embodiment, the decoy UV LED module may include the UV LED chips or the UV LED packages arranged in a plurality of rows.

In one embodiment, the decoy UV LED module may include the UV LED chips or the UV LED packages arranged in a zigzag arrangement.

In one embodiment, the UV LED chips or the UV LED packages may be mounted on opposite surfaces of the support substrate to emit light in opposite directions of the decoy UV LED module.

In one embodiment, the UV LED chips or the UV LED packages may be arranged on the support substrate such that the UV LED chips or the UV LED packages mounted on one surface of the support substrate do not overlap the UV LED chips or the UV LED packages mounted on the other surface of the support substrate.

In one embodiment, a space separated a distance of 5 mm or less from the decoy UV LED module may have a temperature of 30° C. to 60° C.

In one embodiment, the insect trap may further include a cross-fan mesh formed to receive the cross-fan therein.

In one embodiment, the cross-fan mesh may include orifices having a diameter of 1 mm to 3 mm.

In one embodiment, the decoy UV LED installation unit may have a plate shape.

In one embodiment, the decoy UV LED installation unit may include a material capable of reflecting UV light attached to or coated on a lower surface thereof.

In one embodiment, the decoy UV LED installation unit may be provided on a lower surface thereof with a photocatalyst filter providing a deodorization effect using UV light emitted from the decoy UV LED module as a catalyst.

In one embodiment, the photocatalyst filter may include at least one compound selected from the group consisting of titanium oxide ($TiO_2$), silicon oxide ($SiO_2$), tungsten oxide ($WO_3$), zinc oxide ($ZnO$), zirconium oxide ($ZrO_2$), tin oxide ($SnO_2$), cerium oxide ($CeO_2$), iron oxide ($FeO_3$), zinc sulfide ($ZnS$), cadmium sulfide ($CdS$), strontium titanate ($SrTiO_3$), and combinations thereof.

In one embodiment, the insect trap may further include a decoy UV LED installation unit cap detachably coupled to an upper side of the decoy UV LED installation unit.

In one embodiment, the insect trap may further include an insect filter detachably coupled to the inlet port and allowing selective passage of insects therethrough.

In one embodiment, the insect filter may include openings each having an area of 100 $mm^2$ to 225 $mm^2$.

In one embodiment, the insect trap may further include an insecticidal UV LED installation unit on which an insecticidal UV LED module is mounted.

In one embodiment, the insecticidal UV LED installation unit may be mounted on the insect collector.

In one embodiment, the insecticidal UV LED module may emit light having a wavelength of 200 nm to 300 nm.

In one embodiment, the insecticidal UV LED module may be driven to generate an electric energy of 1 kJ or more upon application of a voltage of 12 V to 20 V and an input current of 200 mA to 280 mA.

In one embodiment, the insect trap may have a noise level of 38 dBA or less as measured at a place separated a distance of 1.5 m from the insect trap in a horizontal direction.

In accordance with another embodiment, there is provided an insect trap system including a home appliance and the insect trap as set forth above, the insect trap being provided to a rear surface of the home appliance, wherein UV light emitted from the insect trap is radiated toward a lateral side or an upper side of the home appliance.

In one embodiment, the insect trap may be attached to the rear surface of the home appliance.

In one embodiment, the insect trap may be separated from the rear surface of the home appliance.

In one embodiment, the home appliance may be a stand type or a wall-mounted type.

In accordance with a further embodiment, there is provided an insect trapping method using the insect trap as set forth above, wherein the cross-fan is operated by an air stream generated by rotation of a home appliance fan provided to the home appliance and insects are enticed by heat generated from the home appliance.

In one embodiment, the home appliance may further include a mount by which the insect trap is closely disposed on the home appliance.

In one embodiment, the insect trap may include a main body mesh formed on at least part thereof and an air stream generated by rotation of the home appliance fan passes through the main body mesh to suction insects into the insect trap.

In accordance with yet another embodiment, there is provided an insect trapping method using an insect trap, the insect trap including: a main body; a main body mesh provided to at least part of the main body; an insect collector disposed under the main body; and a decoy UV LED installation unit coupled to a buttress above the main body and having a decoy UV LED module mounted thereon, wherein insects are enticed by heat generated from a home appliance and are suctioned into the insect collector by an air stream generated by rotation of a home appliance fan provided to the home appliance.

The home appliance may further include a mount by which the insect trap is closely disposed on the home appliance.

The insect trap may include a main body mesh formed on at least part thereof and an air stream generated by rotation of the home appliance fan passes through the main body mesh to suction insects into the insect trap.

Advantageous Effects

The insect trap according to the embodiments can provide an ecofriendly insecticidal method.

The insect trap according to the embodiments includes a main body having a fluid dynamical structure to allow an air stream generated by a cross-fan to efficiently flow in a direction from an upper portion of the main body to a lower portion thereof.

The insect trap according to the embodiments can selectively collect insects by controlling a size of an opening of the insect filter and, particularly, can prevent insects having a larger volume than mosquitoes from being introduced into the insect trap, thereby improving durability of the suction fan while suppressing noise generation.

The insect trap according to the embodiments can suppress noise generation by controlling the rotation speed of the suction fan and the number of fan blades.

The insect trap according to the embodiments can generate UV light harmless to humans and capable of effectively enticing insects by controlling the wavelength and intensity of UV light emitted from the decoy UV LED module.

The insect trap according to the embodiments can generate UV light capable of exterminating trapped insects through efficient use of energy by controlling the wavelength and intensity of UV light emitted from the insecticidal UV LED module.

The insect trap according to the embodiments can generate a high air stream velocity providing high insect suction efficiency by controlling the rotation speed of the suction fan and the shape of the main body.

The insect trap according to the embodiments can maximize the insect enticement effect not only by enticing insects using UV light, but also by generating heat while selectively generating carbon dioxide.

The insect trap according to the embodiments is provided with a photocatalyst filter to provide a deodorization function.

BEST MODE

Figure 1:
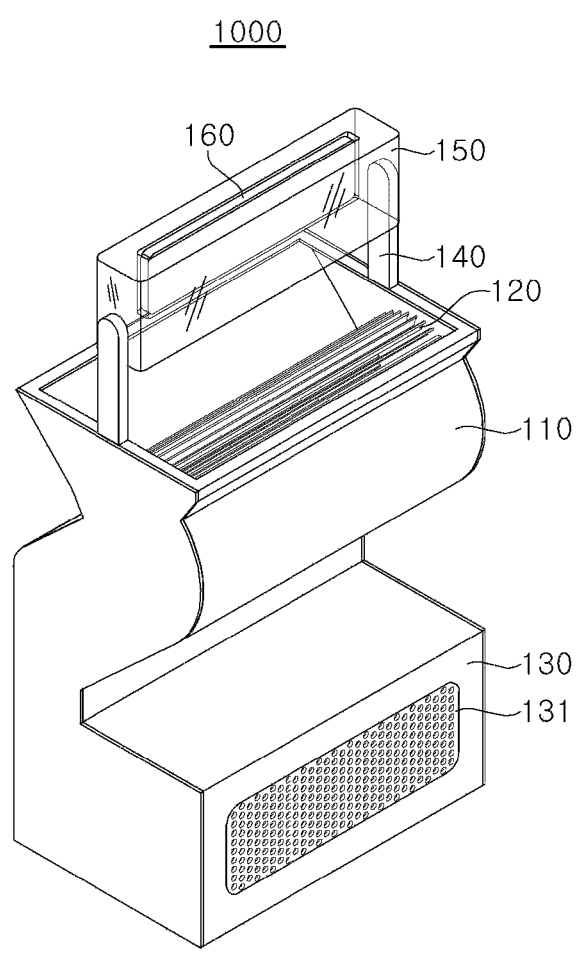
FIG. 1 is a perspective view of an insect trap according to a embodiment of the present disclosure.

Hereinafter, embodiments of the present disclosure will be described in detail with reference to the accompanying drawings. The following embodiments are provided by way of example so as to fully convey the spirit of the present disclosure to those skilled in the art to which the present disclosure pertains.

When an element or layer is referred to as being "disposed above" or "disposed on" another element or layer, it can be directly "disposed above" or "disposed on" the other element or layer or intervening elements or layers can be present. As used herein, spatially relative terms such as "upper" and "lower" are defined with reference to the accompanying drawings. Thus, it will be understood that "upper" can be used interchangeably with "lower".

Throughout the specification, like reference numerals denote like elements having the same or similar functions. In addition, as used herein, the singular forms "a," "an," and "the" may be intended to include the plural forms as well, unless context clearly indicates otherwise. Further, the terms "comprises," "comprising," "including," and "having" are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their performance in the particular order discussed or illustrated, unless specifically identified as an order of performance. It is also to be understood that additional or alternative steps may be employed.

Herein, although a cross-fan is illustrated as a device for generating an air stream for suctioning insects into an insect collector in the following embodiments, it should be understood that the present disclosure is not limited thereto and a centrifugal fan and an axial-flow fan, for example, a turbo fan, a plate fan, a sirocco fan, a propeller fan, a cross-fan, and the like, may also be applied to insect traps of the present disclosure.

Hereinafter, embodiments of the present disclosure will be described in detail with reference to the accompanying drawings.

As used herein, the term "insects" may refer to insect pests, for example, mosquitoes.

Embodiment 1

Figure 2:
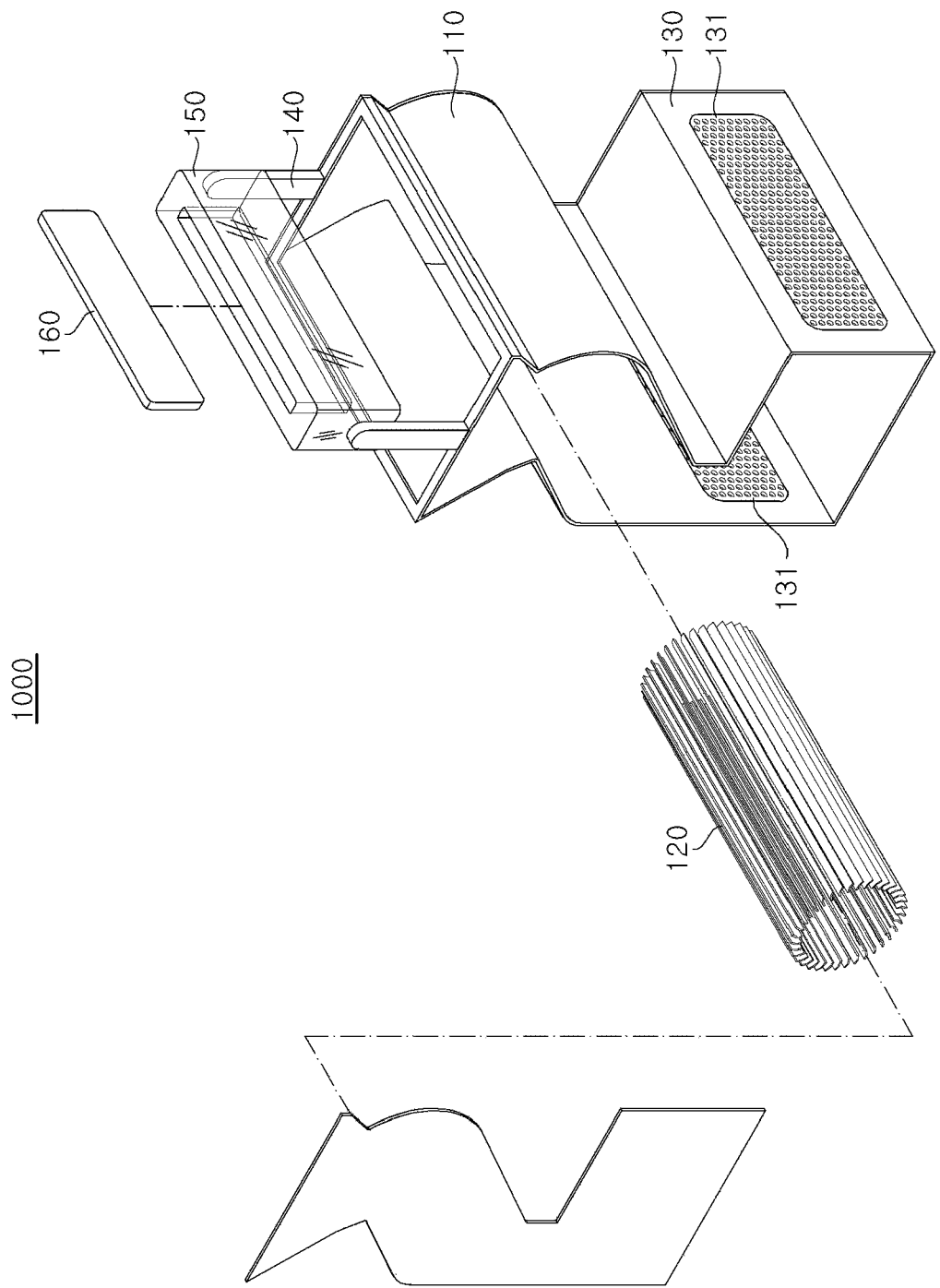
FIG. 2 is an exploded perspective view of the insect trap according to the embodiment of the present disclosure.
Figure 3:
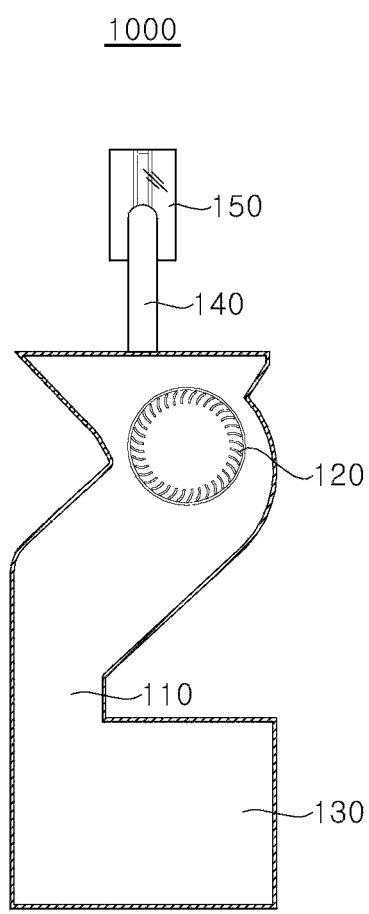
FIG. 3 is a side view of the insect trap according to the embodiment of the present disclosure.

FIG. 1 is a perspective view of an insect trap according to a first embodiment of the present disclosure, FIG. 2 is an exploded perspective view of the insect trap according to the first embodiment of the present disclosure, and FIG. 3 is a side view of the insect trap according to the first embodiment of the present disclosure.

Referring to FIG. 1 to FIG. 3, an insect trap 1000 according to a first embodiment is adapted to collect insects through enticement of the insects using UV light and includes: a main body 110; a cross-fan 120 received in the main body 110; an insect collector 130 detachably coupled to a lower side of the cross-fan 120 and collecting insects; and a decoy UV LED installation unit 150 coupled to a buttress 140 disposed above the main body 110 and provided with a decoy UV LED module 160.

As used herein, insects are not limited to a particular kind of insect and may refer to various kinds of winged insects, particularly, mosquitoes.

Main Body 110

The main body 110 may be designed in consideration of a rotation direction of the cross-fan 120 such that an air stream generated by the cross-fan 120 flows from an inlet port to the insect collector 130.

Although the inlet port of the main body 110 is not restricted to a particular shape, the inlet port of the main body 110 may have a circular shape or a polygonal shape. Specifically, the inlet portion of the main body may have a polygonal shape in order to increase an area through which insects are suctioned into the insect trap by an air stream generated by the cross-fan 120. The main body 110 may be formed of any commercially available plastic material allowing indoor or outdoor use for a long period of time and reduction in manufacturing costs, without limitation. In addition, the main body 110 may be open at upper and lower sides thereof to allow air to vertically pass therethrough.

Specifically, referring to FIG. 1 to FIG. 3, the inlet port of the main body is defined by a space open at an upper side thereof, and a cross-section of the main body 110 corresponding to a facet of the cross-fan on which fan blades of the cross-fan move upwards with reference to a rotation direction of the cross-fan 120 may define a first flow channel and a second flow channel extending perpendicularly from the first flow channel to the insect collector 130, in which the first flow channel is composed of an inclined shape gradually narrowed downwards from the inlet port and a curved shape extending in an arc shape from a lower end of the inclined shape.

As used herein, referring to FIG. 3, when the cross-fan 120 is rotated in the counter clockwise direction, the facet of the cross-fan on which the fan blades of the cross-fan move upwards with reference to the rotation direction of the cross-fan 120 corresponds to a cross-section of the main body 110 at the right side with respect to the center of the cross-fan 120, and a facet of the cross-fan on which the fan blades of the cross-fan move downwards with reference to the rotation direction of the cross-fan 120 corresponds to a cross-section of the main body 110 at the left side with respect to the center of the cross-fan 120.

In addition, the cross-section of the main body 110 corresponding to the facet of the cross-fan on which the fan blades of the cross-fan move downwards with reference to the rotation direction of the cross-fan 120 may define a flow channel extending in a substantially L-shape from the inclined shape and a flow channel extending perpendicularly from the first flow channel to the insect collector 130, in which the flow channel extending from the inclined shape is composed of an inclined shape gradually narrowed downwards from the inlet port to a location of the cross-fan 120.

Accordingly, the main body 110 of the insect trap according to the first embodiment has a cross-sectional shape having a gradually narrowed width from the inlet port to the location of the cross-fan 120, in which a border between the inclined shape and the curved shape extending in the arc shape on the cross-section of the main body corresponding to the facet of the cross-fan on which the fan blades of the cross-fan move upwards with reference to the rotation direction of the cross-fan 120 is placed higher than a border between the inclined shape and the flow channel extending in the substantially L-shape on the cross-section of the main body corresponding to the facet of the cross-fan on which the fan blades of the cross-fan move downwards with reference to the rotation direction of the cross-fan 120, thereby improving generation of an air stream by the cross-fan 120.

That is, the inventors of the present disclosure devised the shape of the main body 110 in light of the fact that a suction air stream is more efficiently formed in terms of fluid dynamics in a structure wherein the cross-section of the main body corresponding to the facet of the cross-fan on which the fan blades of the cross-fan move downwards has a larger area than the cross-section of the main body corresponding to the facet of the cross-fan on which the fan blades of the cross-fan move upwards, when comparing both surfaces of the main body exposed to the cross-fans 120.

In the insect trap according to the first embodiment, the second flow channel may have a narrower width than the first flow channel.

That is, the inventors of the present disclosure designed the main body 110 such that, while air introduced into the main body through the inlet port sequentially passes through the first flow channel and the second flow channel, the air passes through a gradually decreasing area to allow insects suctioned by an air stream generated by rotation of the cross-fan 120 to be efficiently drawn into the insect collector 130 by the air stream.

Cross-Fan 120

Referring to FIG. 1 to FIG. 3, the cross-fan 120 may be disposed between the inlet port of the main body 110 and the insect collector 130.

The cross-fan 120 includes a plurality of fan blades arranged in a cylindrical shape and may be rotated by power supplied from a drive means such as a motor (not shown). The cross-fan 120 may be bent at a right angle or in a predetermined radius of curvature.

The fan blades of the cross-fan 120 are preferably separated a distance of 1 mm to 50 mm from an inner wall of the main body 110. Within this range, the insect trap can secure an insect trapping space and can improve efficiency in generation of a suction air stream while minimizing noise generation.

The cross-fan 120 is disposed to be horizontal to the inlet port of the insect trap such that insects can be suctioned together with air into the main body through the inlet port to be taken into the insect collector 130 upon rotation of the cross-fan 120.

In the insect trap according to the first embodiment, the cross-fan 120 may include 20 to 40 fan blades and may be rotated at a speed of 2,000 rpm to 3,500 rpm.

Preferably, the cross-fan 120 allows insects to be introduced into the main body under the cross-fan 120 without sticking thereto. In a conventional insect trap adapted to collect insects using a typical suction fan, insects stick to fan blades of the suction fan to provide a non-uniform rotational radius of the suction fan, thereby causing deterioration in durability of a motor or noise generation. However, when the rotation speed of the suction fan is reduced to prevent insects from sticking to the fan blades, there is a problem of significant deterioration in efficiency of collecting insects near the insect trap. That is, since insects tend to stop flying at an air stream velocity of 0.8 m/s or more and attempt to escape from the air stream at an excessively high wind speed, the inventors of the present disclosure devised the insect trap 1000 adapted to force mosquitoes to stop flying and to be trapped by a suction air stream generated by the cross-fan 120 while preventing the insects from sticking to the cross-fan 120.

For this purpose, the cross-fan 120 may include 20 to 40 fan blades, preferably 24 to 36 fan blades, and may be rotated at a speed of 2,000 rpm to 3,500 rpm, preferably 2,100 rpm to 3,000 rpm. If the number of fan blades is less than 20 or the rotation speed of the cross-fan 120 is less than 2,000 rpm, the insect trap can suffer from deterioration in efficiency of trapping mosquitoes, and if the number of fan blades exceeds 40 or the rotation speed of the cross-fan 120 exceeds 3,500 rpm, there is a problem of excessive attachment of dead mosquitoes to the cross-fan 120 or increase of noise above 38 dBA.

In the insect trap according to the first embodiment, an air stream generated by the cross-fan 120 has a speed of 0.5 m/s to 3 m/s, preferably 0.8 m/s to 2.5 m/s, in a region having an area four times that of the inlet port with respect to the same center as the inlet port at a height of 20 mm from the inlet port. Since insects, particularly mosquitoes, tend to stop flying and move into the air stream at an air stream velocity of 0.8 m/s or more, an air stream velocity of less than 0.5 m/s can cause reduction in efficiency of forcing insects to be taken into the insect trap and an air stream velocity of higher than 3 m/s allows insects to escape from the insect trap or can cause excessive noise generation.

Accordingly, the inventors of the present disclosure devised the insect trap for preventing insects from sticking to the cross-fan 120 and can force insects to stop flying and to be collected with high efficiency by the insect collector 130, and can suppress noise generation by controlling the rotation speed of the cross-fan 120, the number of fan blades and the velocity of an air stream generated by the cross-fan 120.

Insect Collector 130

The insect collector 130 is detachably attached to the bottom of the main body 110 like a drawer, and at least one surface of the insect collector 130 is preferably formed of a transparent material to allow a user to confirm the number of insects collected in the insect collector 130.

Although the detachable structure of the insect collector 130 is not particularly limited, the insect collector 130 has a guide rail formed along a periphery thereof and the main body 110 is formed at the bottom thereof with a guide protrusion corresponding to the guide rail such that the insect collector 130 can be detachably attached to the main body 110 like a drawer.

Referring to FIG. 1 and FIG. 2, the insect collector 130 according to the first embodiment may include insect collector mesh members 131 through which air introduced into the main body by the cross-fan 120 is discharged to the outside.

The insect collector mesh member 131 comprises mesh openings having a diameter of 1 mm to 3 mm to prevent insects collected in the insect collector 130 from escaping while allowing efficient air flow.

Specifically, the insect collector 130 includes 1 to 10 insect collector mesh members 131, for example, 2 to 8 mesh members, and each of the insect collector mesh members 131 may have 300 to 700 mesh openings, preferably 400 to 600 mesh openings.

That is, the insect collector 130 is adapted to allow the air stream generated by the cross-fan 120 to be effectively discharged from the insect trap 1000, whereby mosquitoes collected in the insect collector 130 can be dried to be killed.

Decoy UV LED Installation Unit 150

Referring to FIG. 1 to FIG. 3, the decoy UV LED installation unit may be disposed above the main body 110 via the buttress 140 and the decoy UV LED module 160 may be mounted on the decoy UV LED installation unit 150 to be detachably coupled to the decoy UV LED installation unit 150.

In addition, the decoy UV LED installation unit 150 may be coupled to the buttress 140 so as to be rotated such that the direction of light emitted from the decoy UV LED module 160 can be controlled by a user, as needed.

The decoy UV LED installation unit 150 is formed corresponding to the decoy UV LED module 160 and is provided with a decoy UV LED module cover to protect the decoy UV LED module 160, thereby preventing the decoy UV LED module 160 from being damaged by external dust or insects. The decoy UV LED module cover may be transparent.

The decoy UV LED module cover may be formed in various shapes to act as a lens for spreading or collecting light emitted from the decoy UV LED module 160 in a predetermined direction. The decoy UV LED module cover may include, for example, glass, quartz, and the like.

In addition, since PMMA (poly(methyl methacrylate)) having a monomer ratio of about 80% or more is mainly composed of carbon and hydrogen to form a thin electron cloud and has high UV transmittance, the decoy UV LED module cover may be formed of PMMA.

Decoy UV LED Module 160, 260, 360

Figure 10:
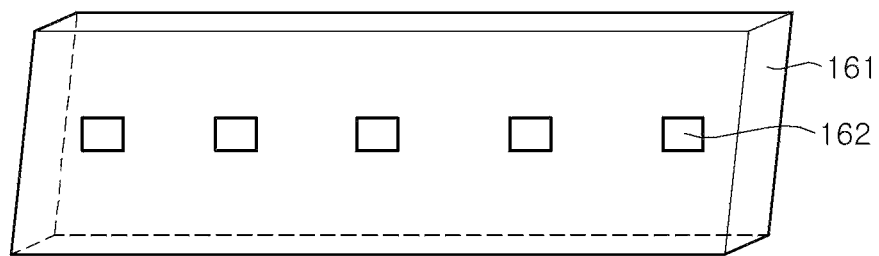
FIG. 10 to FIG. 12 are views of UV LED modules according to embodiments of the present disclosure.
Figure 11:
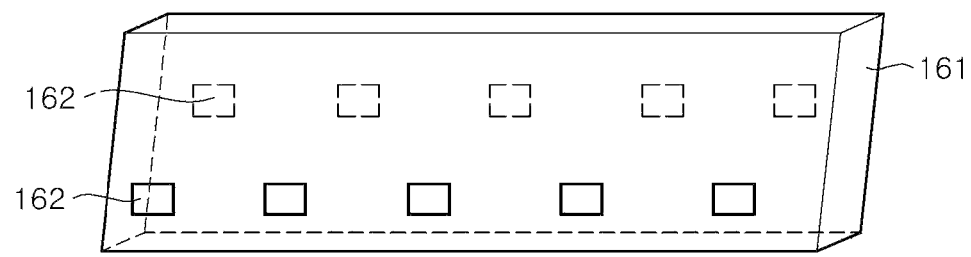
Figure 12:
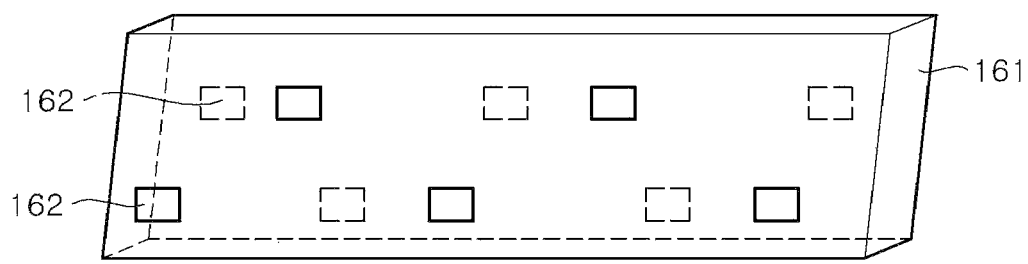

FIG. 10 to FIG. 12 are views of UV LED modules 160, 260, 360 according to embodiments of the present disclosure.

The decoy UV LED modules 160, 260, 360 may provide at least one of UV light, visible light, and infrared light, preferably UV light. With regard to insect enticing wavelengths, reports say that flies and leafhoppers are enticed by light having a wavelength of about 340 nm or about 575 nm and moths and mosquitoes are enticed by light having a wavelength of about 366 nm. In addition, reports say that other general insect pests are enticed by light having a wavelength of about 340 nm to about 380 nm.

Preferably, the decoy UV LED modules 160, 260 360 emit light having a wavelength of 340 nm to 390 nm. More preferably, UV LED modules 160, 260 360 emit light having a wavelength of about 365 nm, which strongly entices insects and has low harmfulness to humans.

The decoy UV LED modules 160, 260, 360 may have a light output of 800 mW to 1,500 mW upon application of a voltage of 10 V to 15 V and an input current of 72 mA to 100 mA. Within this range, the UV LED modules 160, 260, 360 can achieve effective enticement of insects with UV light having a wavelength of 365 nm, which is not harmful to the human body, while minimizing power consumption.

Each of the decoy UV LED modules 160, 260, 360 may include one or more chip-on-board (COB) type UV LED chip 162 or one or more UV LED packages mounted on a support substrate 161. The UV LED chips 162 or the UV LED packages may be arranged in a plurality of rows. Alternatively, the UV LED chips 162 or the UV LED packages may be disposed in a zigzag arrangement in order to prevent the support substrate 161 from overheating.

The support substrate 161 may have a panel shape having a predetermined thickness and include a printed circuit board having an integrated circuit or interconnection lines therein. By way of example, the support substrate 161 may be a printed circuit board having a circuit pattern printed in a region on which the UV LED chips 162 will be mounted, and may be composed of a material such as a metal, a semiconductor, a ceramic, a polymer, and the like.

Specifically, the decoy UV LED modules 160, 260, 360 may have a structure wherein the UV LED chips 162 are mounted on one surface of a PCB having an elongated plate shape. In each of the UV LED modules 160, 260, 360, the plurality of UV LED chips 162, for example, 4 to 10 UV LED chips 162 are arranged at certain intervals on the PCB in a longitudinal direction of the PCB. Heat dissipation fins may be provided to the other surface of the PCB to dissipate heat generated from the UV LED chips 162, and both ends of each of the UV LED modules 160, 260, 360 may be provided with terminals which will be connected to a power source to supply power to the PCB.

In each of the UV LED modules 160, 260, 360, the UV LED chips 162 or the UV LED packages may be mounted on the support substrate 161 such that the UV LED chips 162 or the UV LED packages mounted on one surface of the support substrate 161 do not overlap the UV LED chips 162 or the UV LED packages mounted on the other surface of the support substrate 161. The UV LED chips 162 or the UV LED packages may be arranged in a plurality of rows or in a zigzag arrangement, without being limited thereto. Accordingly, the insect trap 1000 according to the first embodiment can minimize power consumption while enlarging an irradiation range, and can improve durability of each of the UV LED modules 160, 260, 360 through effective dissipation of heat generated from the UV LED chips 162.

While electric energy supplied to the UV LED modules 160, 260, 360 is converted into light energy and heat energy, heat is generated from the UV LED chips 162 and a space separated a distance of 5 mm or less from the UV LED chips 162 may have a temperature of 30° C. to 60° C. Since insects, particularly mosquitoes, are strongly enticed by a material having a temperature of about 38° C. to 40° C., which is similar to mammalian body temperature, the insect trap 1000 can strongly entice insects through heat generated from the UV LED modules 160, 260, 360 in addition to enticing effects of the UV LED modules 160, 260, 360.

Accordingly, the insect trap 1000 according to the first embodiment employs the UV LED modules 160, 260, 360 adapted to consume a power of 800 mW to 1,500 mW upon application of a voltage of 10 V to 15 V and an input current of 72 mA to 100 mA, and includes the UV LED chips 162 or the UV LED packages mounted on the support substrate 161 such that the UV LED chips 162 or the UV LED packages mounted on one surface of the support substrate 161 do not overlap the UV LED chips 162 or the UV LED packages mounted on the other surface of the support substrate, whereby the insect trap 1000 can emit light harmless to humans and having high insect enticing efficiency while minimizing power consumption and can generate heat such that surroundings of the insect trap 1000 have a temperature providing high insect enticing effects.

In addition, the insect trap 1000 according to the first embodiment can achieve substantial noise reduction through control of the rotation speed of the cross-fan 120, the number of fan blades, and the shape of the main body 110. Specifically, the insect trap 1000 according to the first embodiment may have a noise level of 38 dBA or less, as measured at a distance of 1.5 m from the insect trap in the horizontal direction. Here, noise may be measured using a sound level tester (CENTER 320, TESTO Co., Ltd.).

Embodiment 2

Figure 4:
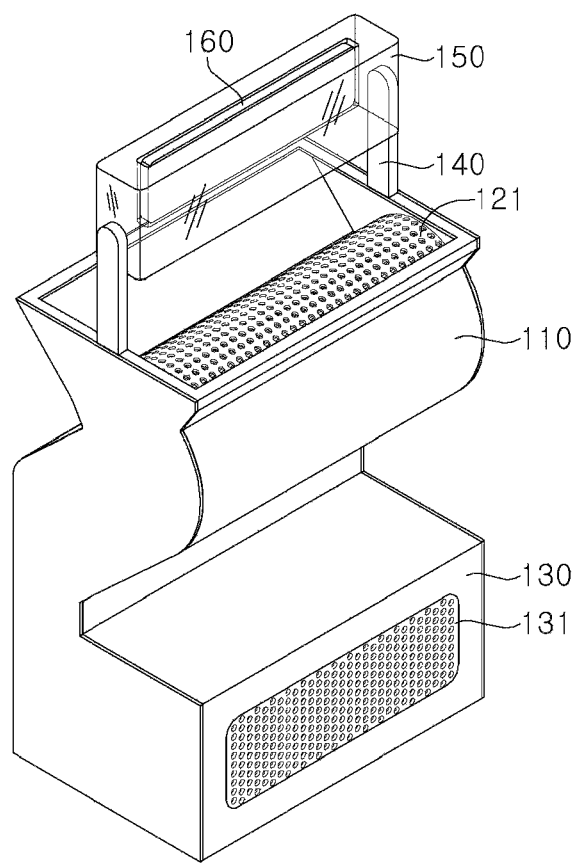
FIG. 4 is a perspective view of an insect trap according to an embodiment of the present disclosure.
Figure 5:
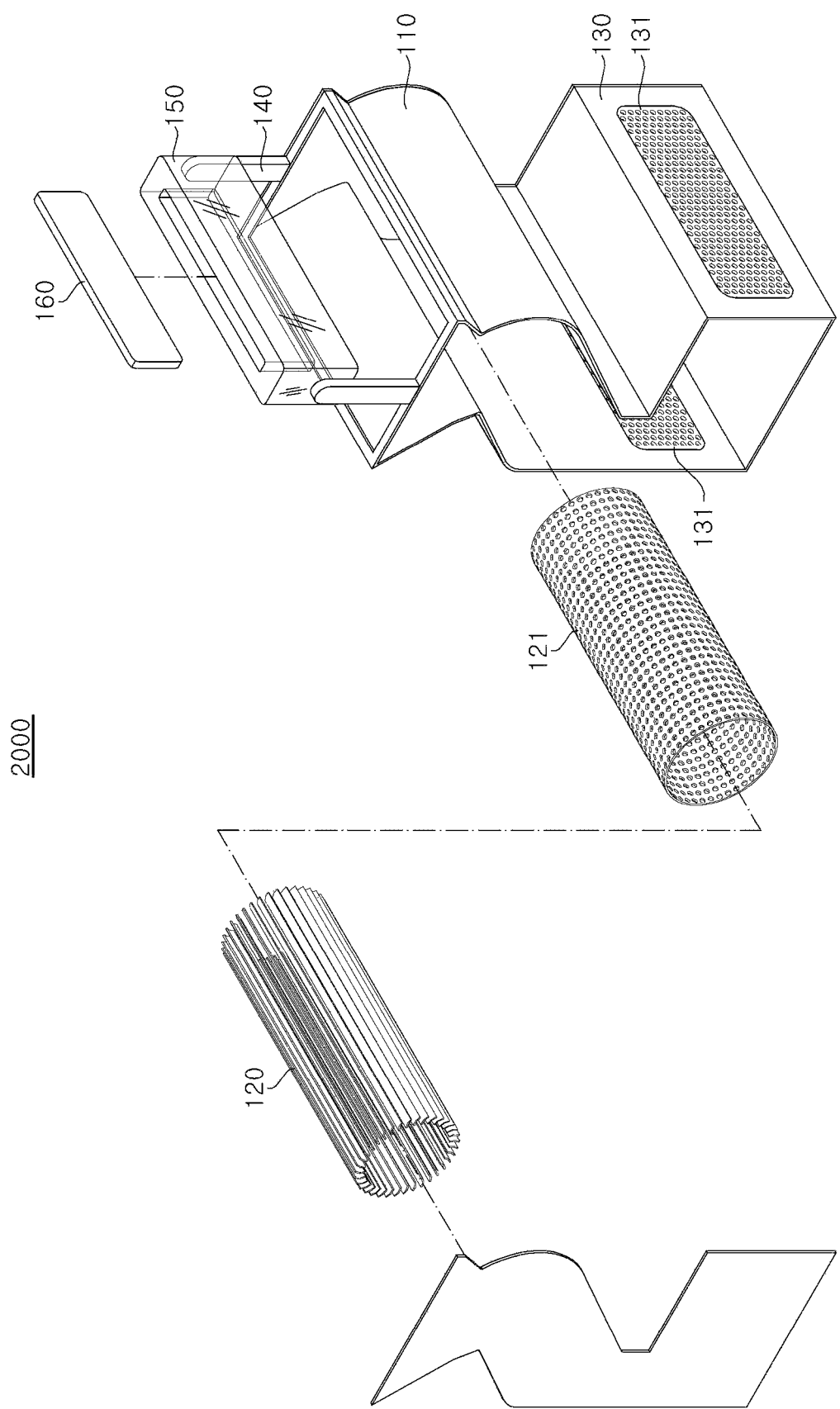
FIG. 5 is an exploded perspective view of the insect trap according to the embodiment of the present disclosure.

Referring to FIG. 4 and FIG. 5, an insect trap 2000 according to a second embodiment of the present disclosure may further include a cross-fan mesh 121 adapted to receive the cross-fan 120 therein, in which the cross-fan mesh 121 has orifices having a diameter of 1 mm to 3 mm.

The insect trap 2000 according to the second embodiment has the same configuration as the insect trap according to the first embodiment except for the cross-fan mesh 121 and thus the following description will focus on the cross-fan mesh 121.

The cross-fan mesh 121 is formed with the orifices having a diameter of 1 mm to 3 mm to prevent mosquitoes from passing therethrough without suppressing generation of an air stream and may protect the cross-fan 120 to suppress physical collision between the cross-fan 120 and insects, particularly mosquitoes.

As such, in order to prevent noise generation or deterioration in durability of a motor due to insects sticking to the cross-fan 120 by physical impact, the inventors of the present disclosure manufactured the insect trap 2000 such that the cross-fan 120 can be protected by the cross-fan mesh 121 including the orifices having a diameter of 1 mm to 3 mm to prevent insects, particularly mosquitoes, from passing therethrough without suppressing generation of an air stream.

Embodiment 3

Figure 6:
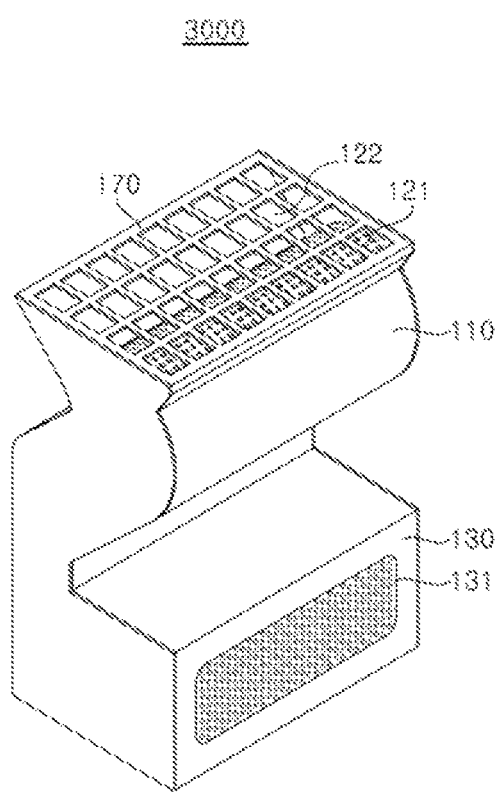
FIG. 6 is a perspective view of an insect trap according to an embodiment of the present disclosure.

Referring to FIG. 6, an insect trap 3000 according to a third embodiment of the present disclosure may further include an insect filter 170 detachably attached to the inlet port and allowing selective passage of insects therethrough.

The insect trap 3000 according to the third embodiment has the same configuration as the insect trap according to the first embodiment except for the insect filter 170 and thus the following description will focus on the insect filter 170.

The insect filter 170 may have a lattice shape including a plurality of insect passage openings 122 selectively allowing insects to pass therethrough, in which the size of the insect passage openings 122 may be adjusted by taking into account an average size of insects to be collected.

A typical insect trap configured to collect insects using a suction fan in the related art has problems of a short replacement cycle of the insect collector 130 due to collection of insects, such as butterflies, dragonflies and flies, which have a larger volume than mosquitoes, and negative influence on the ecosystem due to collection of beneficial insects as well as harmful insects. Moreover, the typical insect trap has problems such as decrease in lifespan of the motor and noise generation by the suction fan due to attachment of large insects to the suction fan. Accordingly, the inventors of the present disclosure developed the insect trap 3000 that allows the size of the insect passage openings 122 to be controlled such that the insect trap can selectively suction insects and includes an economically feasible insect filter 170.

Each of the insect passage openings 122 may have an area of 100 mm$^2$ to 225 mm$^2$. Accordingly, the insect passage openings 122 may allow selective passage of insects, particularly mosquitoes, therethrough, while preventing passage of larger insects, such as butterflies, dragonflies, flies, and the like into the insect trap 3000, thereby preventing deterioration in durability of the motor while suppressing noise generated from the cross-fan 120.

Embodiment 4

Figure 7:
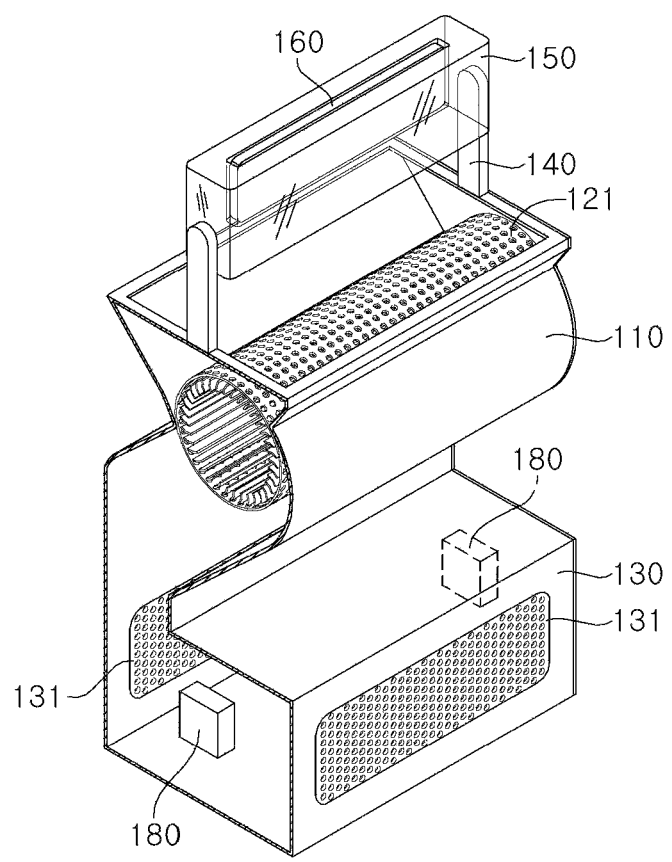
FIG. 7 is a perspective view of an insect trap according to an embodiment of the present disclosure.

Referring to FIG. 7, an insect trap 4000 according to a fourth embodiment of the present disclosure includes an insecticidal UV LED installation unit 180 on which an insecticidal UV LED module adapted to emit light having a wavelength of 200 nm to 300 nm is mounted.

The insect trap 4000 according to the fourth embodiment has the same configuration as the insect trap according to the first embodiment except for the insecticidal UV LED installation unit 180 provided with the insecticidal UV LED module and thus the following description will focus on the insecticidal UV LED installation unit 180 provided with the insecticidal UV LED module.

Although not limited to a particular location, the insecticidal UV LED installation unit 180 is preferably mounted on the insect collector 130 in which collected insects stay for the longest period of time.

That is, the insect trap 4000 can exterminate insects, particularly mosquitoes, collected in the insect collector 130 not only by drying the insects, but also by irradiation with UVC (ultraviolet C) light through additional installation of the insecticidal UV LED installation unit 180, which can secure good energy efficiency and insecticidal efficiency while rapidly exterminating the insects. Specifically, the insecticidal UV LED installation unit 180 may emit UVC light having a wavelength of 200 nm to 300 nm.

In addition, the insecticidal UV LED module may be controlled to generate an electrical energy of 1 kJ upon application of a voltage of 12 V to 20 V and an input current of 200 mA to 280 mA, thereby enabling extermination of insects collected in the insect collector with low energy for a relatively short time.

Embodiment 5

Figure 8:
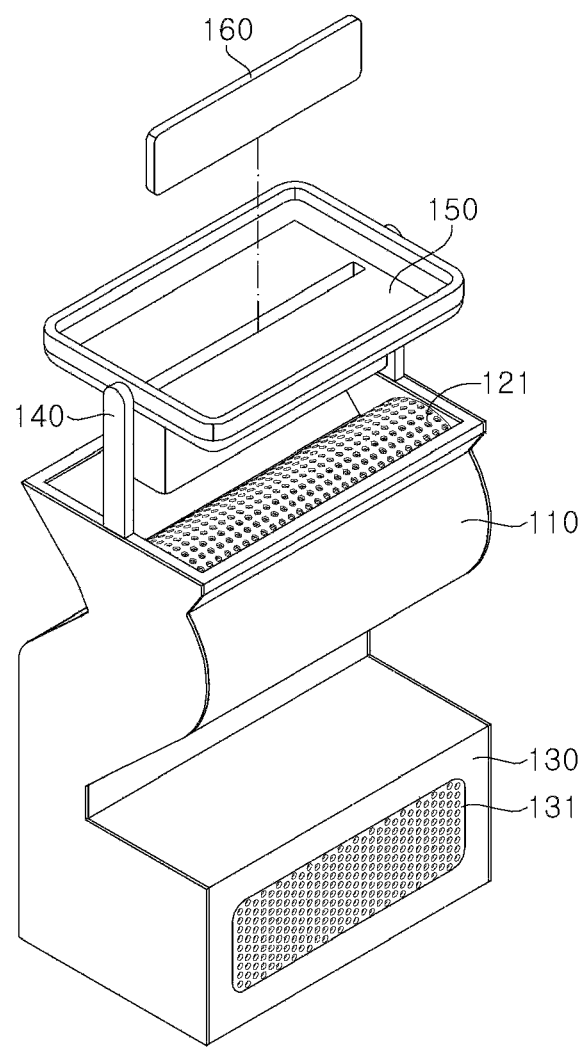
FIG. 8 is a perspective view of an insect trap according to an embodiment of the present disclosure.

Referring to FIG. 8, an insect trap 5000 according to a fifth embodiment may include a plate-shaped decoy UV LED installation unit 150.

The insect trap 5000 according to the fifth embodiment has the same configuration as the insect trap according to the first embodiment except that the decoy UV LED installation unit 150 has a plate shape and the insect trap 5000 further includes a decoy UV LED installation unit cap 151. Thus, the following description will focus on the plate-shaped decoy UV LED installation unit 150 and the decoy UV LED installation unit cap 151.

The decoy UV LED installation unit 150 having a plate shape may be formed in a similar shape and/or size to the shape and size of the main body 110. For example, in an embodiment wherein the main body 110 has a polygonal shape, the UV LED installation unit 150 may have a polygonal shape having a similar size to the main body 110.

With this structure, the plate-shaped decoy UV LED installation unit 150 restricts flow of an air stream generated by the cross-fan 120 into a space defined between the decoy UV LED installation unit 150 and the main body 110, thereby improving efficiency of generating a suction air stream into the insect trap 5000. As a result, the cross-fan 120 is not required to be rotated at high rpm, thereby minimizing noise generation.

In some embodiments, the insect trap may further include a buttress 140 adapted to support the decoy UV LED installation unit 150 above the main body 110 while separating the decoy UV LED installation unit 150 from the main body 110 so as to allow insects to be suctioned into the space between the main body 110 and the decoy UV LED installation unit 150.

The decoy UV LED installation unit 150 may be provided with the decoy UV LED module 160. The decoy UV LED module 160 may be inserted into the decoy UV LED installation unit 150 through an upper side thereof and may be placed on a lower surface of the plate-shaped decoy UV LED installation unit 150.

Although the shape and number of buttresses 140 are not particularly limited, two buttresses 140 may be disposed to face each other in order to minimize restriction of an insect introduction area by the buttresses 140 while stably supporting the decoy UV LED installation unit 150.

The height of the buttress 140 may be adjusted such that the decoy UV LED installation unit 150 is separated a distance of 3 cm to 30 cm, preferably 5 cm to 20 cm, from the main body 110 in the vertical direction. Specifically, the height of the buttress 140 may be the same as a separation distance between the decoy UV LED installation unit 150 and the main body 110 in the vertical direction. If the separation distance between the decoy UV LED installation unit 150 and the main body 110 in the vertical direction is less than 1 cm, the space defined between the decoy UV LED installation unit 150 and the main body 110, into which insects are suctioned, becomes too small, thereby causing deterioration in insect collection efficiency, and if the separation distance therebetween is greater than 30 cm, the air stream generated by the cross-fan 120 does not have sufficient intensity to suction insects.

Accordingly, for the decoy UV LED installation unit 150 having a plate shape, when insects are enticed by UV light and approach the insect trap 5000, the insects are suctioned into the space between the main body 110 and the decoy UV LED installation unit 150 by a suction air stream generated by the cross-fan 120, pass through the inlet port, and are finally collected by the insect collector 130.

Although not shown in FIG. 8, a material capable of reflecting UV light emitted from the UV LED module may be attached to or coated on a lower surface of the decoy UV LED installation unit 150. Silver or aluminum may be used as the material capable of reflecting the UV light, without being limited thereto, and may be coated onto the lower surface of the decoy UV LED installation unit 150. The lower surface of the decoy UV LED installation unit 150 may further include a round or irregular pattern having a variety of shapes to scatter the light emitted from the UV LED module.

The insect trap 5000 may further include a photocatalyst filter disposed on the lower surface of the decoy UV LED installation unit 150 to provide a deodorization function using UV light emitted from the decoy UV LED module 160 as a catalyst.

The photocatalyst filter may be disposed at any location in the insect trap so long as the photocatalyst filter can receive UV light emitted from the decoy UV LED module 160.

Preferably, the photocatalyst filter is embedded in the insect trap instead of being provided in a protrusion structure. Specifically, in a lateral embedment type wherein the photocatalyst filter is embedded in a side surface of the insect trap 5000 to contact an air stream generated in the insect trap 5000, an inner space of the insect trap 5000 may be efficiently constituted without obstructing suction of insects and air into the insect trap 5000.

The photocatalyst filter may be formed by depositing a photocatalyst layer on a frame. By way of example, the photocatalyst filter may be formed by embedding a photocatalyst layer in a porous material, such as metal foam and carbon foam, or in a ceramic material. Light inducing photocatalysis reaction may be UV light having a wavelength of 200 nm to 400 nm.

The photocatalyst filter may include at least one photocatalyst material selected from the group consisting of, for example, titanium oxide ($TiO_2$), silicon oxide ($SiO_2$), tungsten oxide ($WO_3$), zinc oxide (ZnO), zirconium oxide ($ZrO_2$), tin oxide ($SnO_2$), cerium oxide ($CeO_2$), iron oxide ($FeO_3$), zinc sulfide (ZnS), cadmium sulfide (CdS), strontium titanate (SrTiO3), and combinations thereof. Preferably, the photocatalyst filter is realized by a photocatalyst layer coated with titanium oxide ($TiO_2$).

The photocatalyst filter can provide an effect of purifying air around the insect trap by generating radicals, which decompose organic materials in air around the photocatalyst filter.

In addition, the photocatalyst layer may generate $CO_2$, which has high efficiency in enticement of insects, particularly mosquitoes, while providing the deodorization effect. Specifically, when the photocatalyst layer is irradiated with light emitted from the decoy UV LED module 160 and inducing photocatalysis reaction, radicals exhibiting strong reducibility can be generated from the photocatalyst layer through photocatalysis reaction known in the art. Then, an organic component around the photocatalyst layer can be decomposed by the radicals to generate carbon dioxide. Carbon dioxide is known as a gas capable of enticing insects, particularly, mosquitoes.

Further, in order to promote generation of carbon dioxide, an enticing substance, such as lactic acid, an amino acid, sodium chloride, uric acid, ammonia, and protein decomposition substances, may be provided to the photocatalyst filter. By way of example, as a method of providing the enticing substance, the enticing substance may be deposited onto the photocatalyst layer in the photocatalyst filter or may be periodically or aperiodically sprayed onto the photocatalyst layer, without being limited thereto. As a result, the concentration of carbon dioxide can increase, thereby improving insect enticing efficiency.

That is, the insect trap 5000 according to this embodiment may use not only light and heat generated from the UV LED module 160 but also carbon dioxide as insect enticing media, thereby significantly improving efficiency in enticing insects, particularly mosquitoes, while providing the deodorization function.

Figure 9:
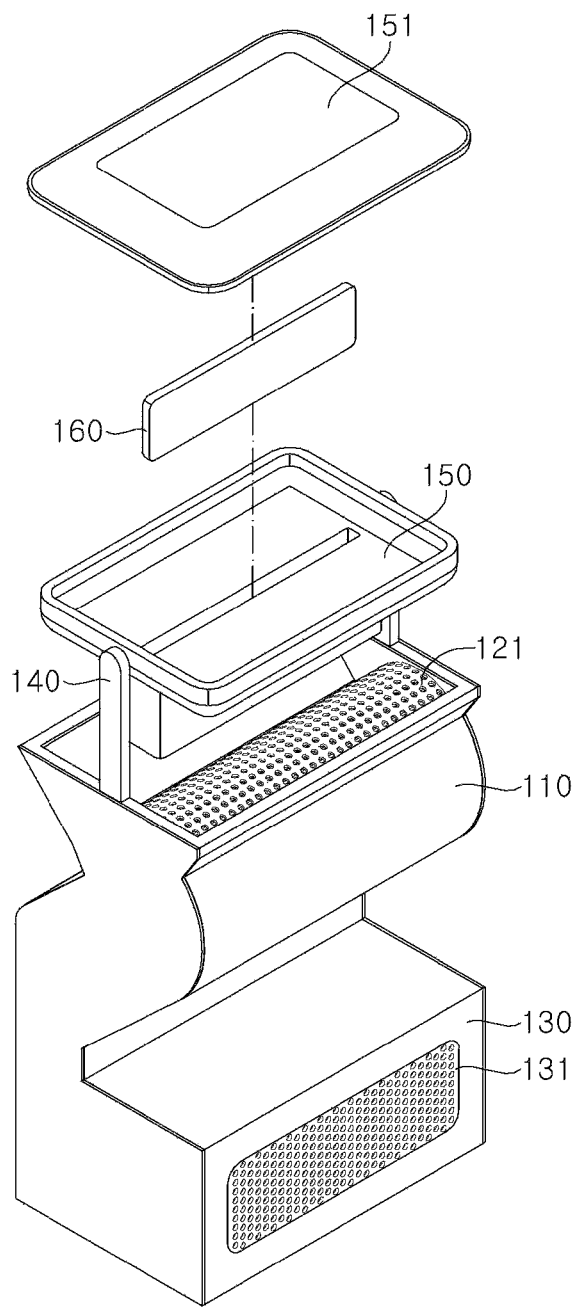
FIG. 9 is an exploded perspective view of the insect trap according to the embodiment of the present disclosure.

Referring to FIG. 9, the insect trap 5000 according to the fifth embodiment may include the decoy UV LED installation unit cap 151.

The decoy UV LED installation unit cap 151 may extend from an upper surface of the decoy UV LED installation unit 150 beyond the decoy UV LED installation unit 150 in the horizontal direction.

The shape and material of the decoy UV LED installation unit cap 151 may be the same as those of the decoy UV LED installation unit 150, without being limited thereto. For example, in an embodiment wherein the decoy UV LED installation unit 150 has a polygonal circular shape, the decoy UV LED installation unit cap 151 may have a shape coaxial with the decoy UV LED installation unit 150 and having a larger diameter than the decoy UV LED installation unit 150.

In the structure of the insect trap wherein the decoy UV LED installation unit cap 151 has a longer length than the plate-shaped decoy UV LED installation unit 150, an air stream generated by the cross-fan 120 has a velocity of 0.5 m/s to 3.0 m/s, preferably 0.8 m/s to 2.5 m/s, as measured in a region extending from the decoy UV LED installation unit cap 151 to an upper end of the main body 110 in the vertical direction, thereby providing a suitable air stream velocity forcing mosquitoes to stop flying and be suctioned into the insect trap 5000.

As described above, the decoy UV LED installation unit 150 may be disposed at a location separated a distance of 3 cm to 30 cm from the inlet port and the diameter of the decoy UV LED installation unit cap 151 may be adjusted to maintain the air stream generated by the cross-fan 120 without being influenced by external wind, whereby the insect trap can stably suction insects, enticed by UV light from the UV LED module, into the insect collector 130.

Embodiment 6

Figure 13:
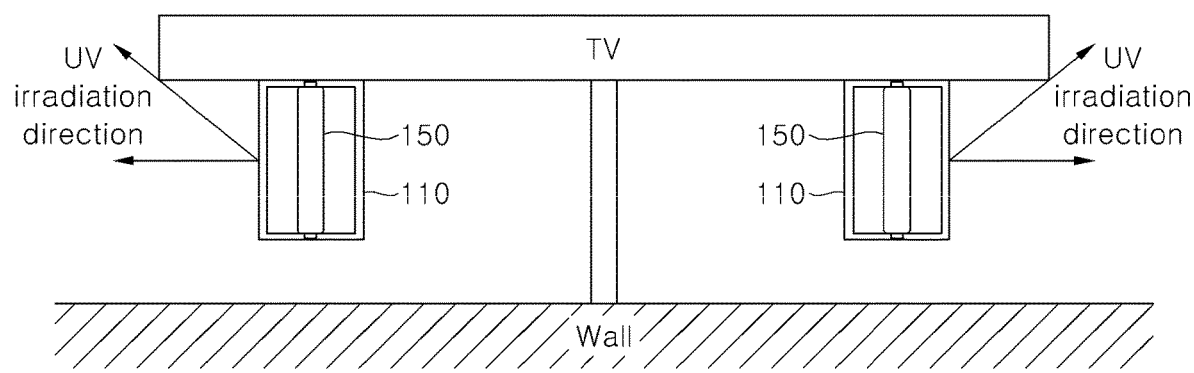
FIG. 13 to FIG. 15 are views of insect trap systems according to embodiments of the present disclosure.
Figure 14:
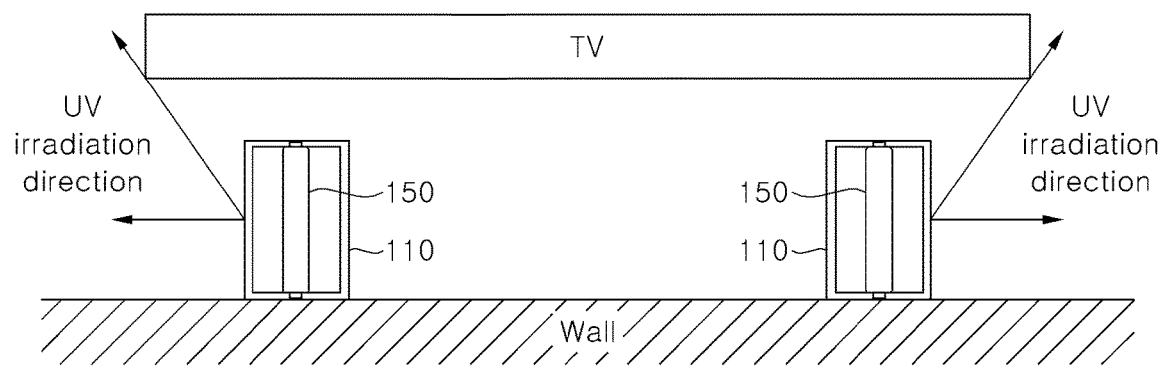
Figure 15:
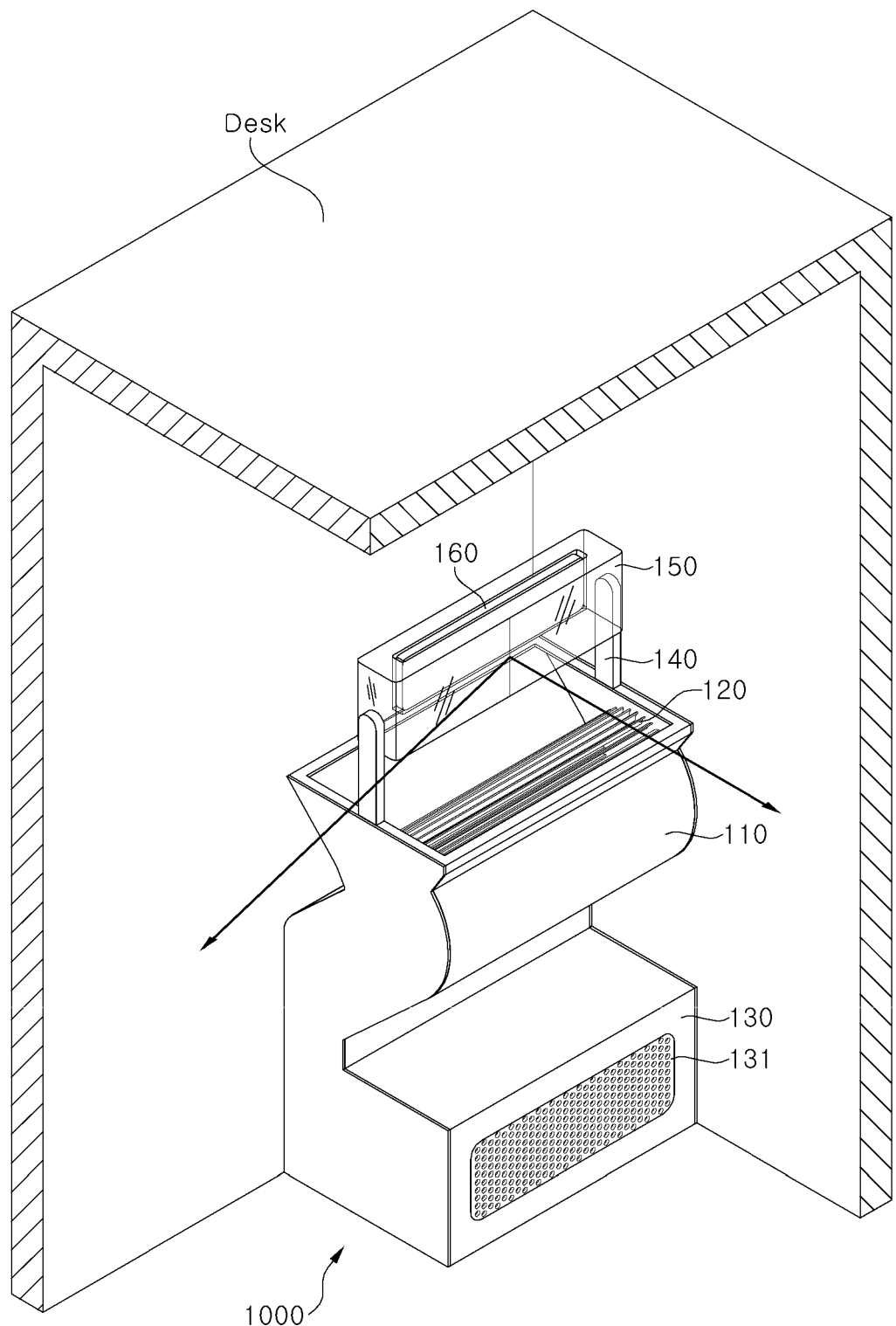

FIG. 13 to FIG. 15 are views of insect trap systems according to embodiments of the present disclosure, which include the insect traps 1000, 2000, 3000, 4000, 5000 according to the embodiments of the present disclosure. Although the insect trap 1000 according to the first embodiment is shown in FIG. 13 to FIG. 15, it should be understood that the present disclosure it not limited thereto.

The insect trap system according to the embodiments of the present disclosure may include a home appliance and the insect trap 1000; 2000; 3000; 4000; 5000 according to any one of claims 1 to 31 disposed on a rear surface of the home appliance, wherein UV light emitted from the insect trap 1000; 2000; 3000; 4000; 5000 is directed towards a side surface or an upper surface of the home appliance.

Specifically, referring to FIG. 13 and FIG. 14, the insect trap 1000 may be disposed between a TV and a wall. That is, the insect trap 1000 may be attached to the rear surface of the TV, the wall, or may be disposed to be placed therebetween such that UV light is directed towards a side surface of the TV so as to collect insects, particularly mosquitoes, at a location apart from a user watching the TV.

Although a wall-mounted TV is illustrated in the drawings, it should be understood that the present disclosure is not limited thereto and the insect trap may be disposed on a rear surface of a stand type TV, various pieces of furniture, such as a monitor, a shelf, a picture frame, or an ornament.

Referring to FIG. 15, the insect trap according to the embodiment may be provided to a lower surface of a table or a desk to efficiently trap mosquitoes and the like at a place not visible to a user.

Embodiment 7

Figure 16:
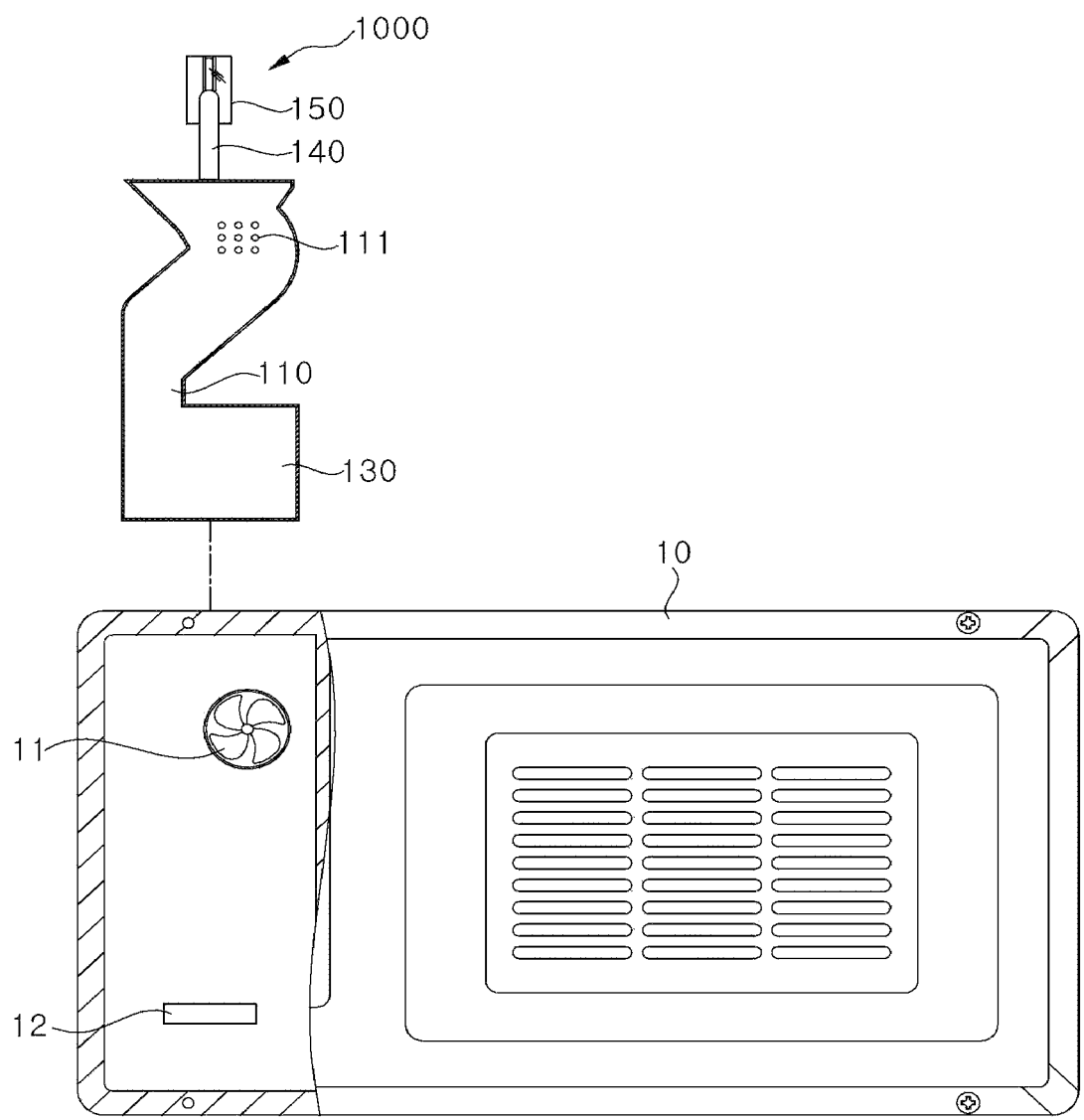
FIG. 16 and FIG. 17 are views of an insect trap according to an embodiment of the present disclosure in use.
Figure 17:
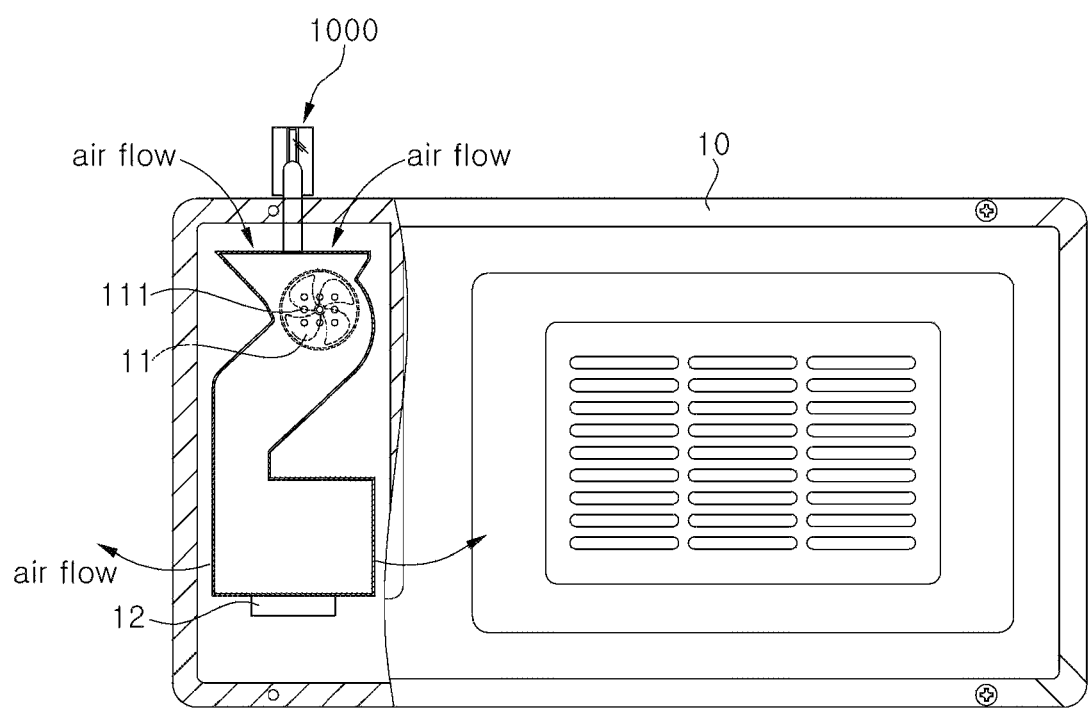

FIG. 16 and FIG. 17 are views of insect traps 1000, 2000, 3000, 4000, 5000 according to embodiments of the present disclosure in use, which have the same configurations as those of the first to sixth embodiments of the present disclosure except that the cross-fan 120 is not provided thereto.

The insect trap 1000; 2000; 3000; 4000; 5000 is provided with a main body mesh 111 disposed on at least one surface of the main body 110 and allowing air to pass therethrough. The main body mesh 111 may be disposed to adjoin a fan 11, for example, a cooling fan, of a home appliance 10, for example, a microwave oven, a refrigerator, a computer, and the like. Although FIG. 17 shows one exemplary arrangement of the insect trap 1000; 2000; 3000; 4000; 5000, it should be understood that the present disclosure is not limited thereto. For example, the insect trap 1000; 2000; 3000; 4000; 5000 may be interposed between the home appliance 10 and a wall. In this embodiment, the main body mesh 111 may be provided to each of four surfaces of the main body 110 and covered by a main body mesh cover (not shown), thereby facilitating fluid dynamic generation of an air stream suctioning insects through selection of openings depending upon arrangement of the insect trap 1000; 2000; 3000; 4000; 5000. The home appliance 10 may include various members for guiding or securing the insect trap 1000; 2000; 3000; 4000; 5000. For example, the home appliance 10 may include a mount 12 on which the insect trap 1000; 2000; 3000; 4000; 5000 can be stably seated.

That is, even without the cross-fan 120, the insect trap 1000; 2000; 3000; 4000; 5000 is provided to the home appliance such that the main body mesh 111 is brought into contact with the home appliance fan 11 to allow collection of insects by an air stream generated by the home appliance fan 11, thereby enabling substantial reduction in power consumption while improving insect collection efficiency by heat generated from the home appliance 10. In addition, air deodorized or purified by the photocatalysis material, carbon dioxide ($CO_2$) generated through photocatalysis reaction of the photocatalysis material and effective in enticement of insects, particularly mosquitoes, or enticement substances generated from an insect enticing agent provided to the insect trap 1000; 2000; 3000; 4000; 5000 can be effectively spread by the air stream generated by the home appliance fan 11, thereby further improving insect collection efficiency.

Embodiment 8

Figure 18:
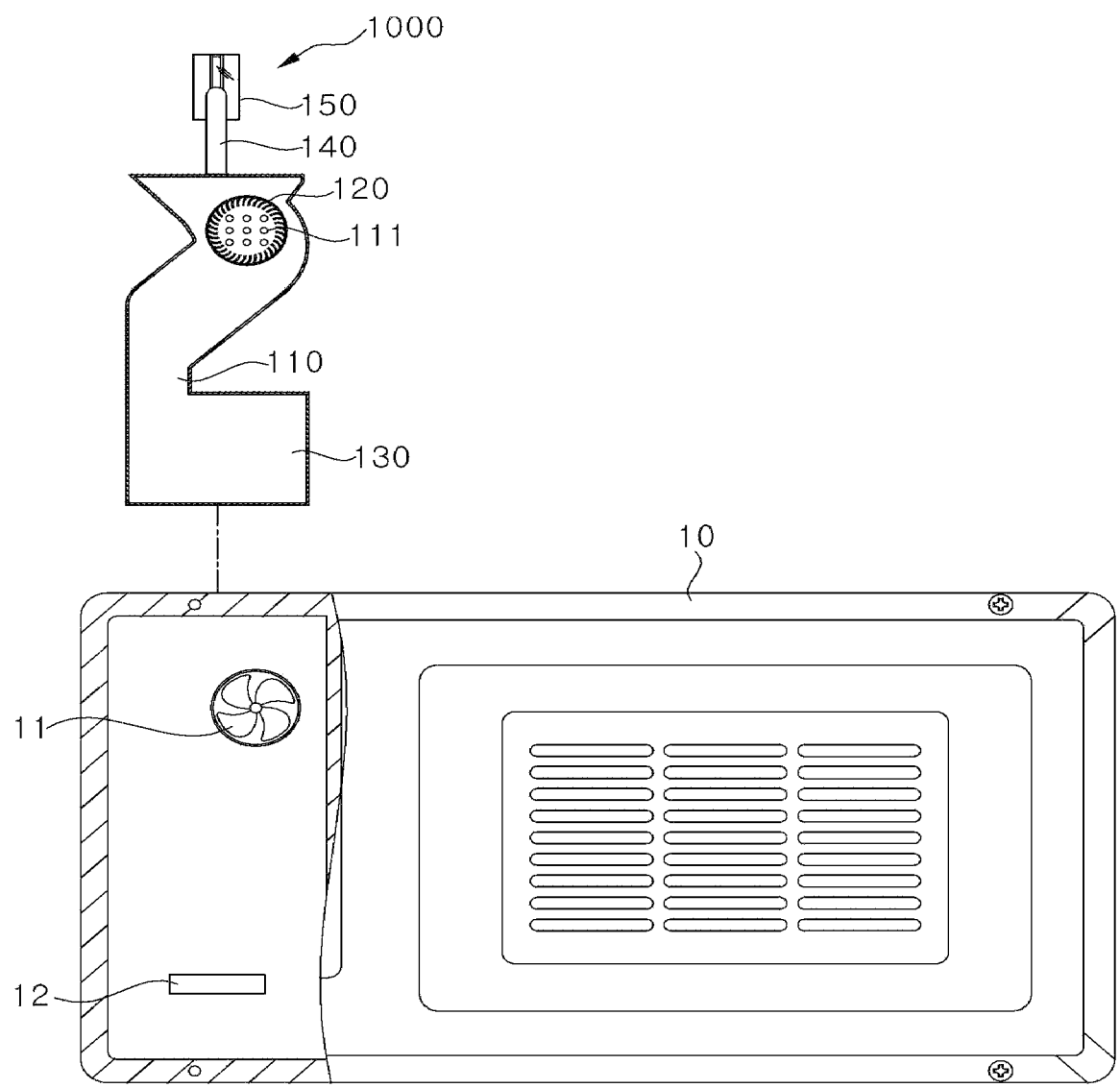
FIG. 18 and FIG. 19 are views of an insect trap according to an embodiment of the present disclosure in use.
Figure 19:
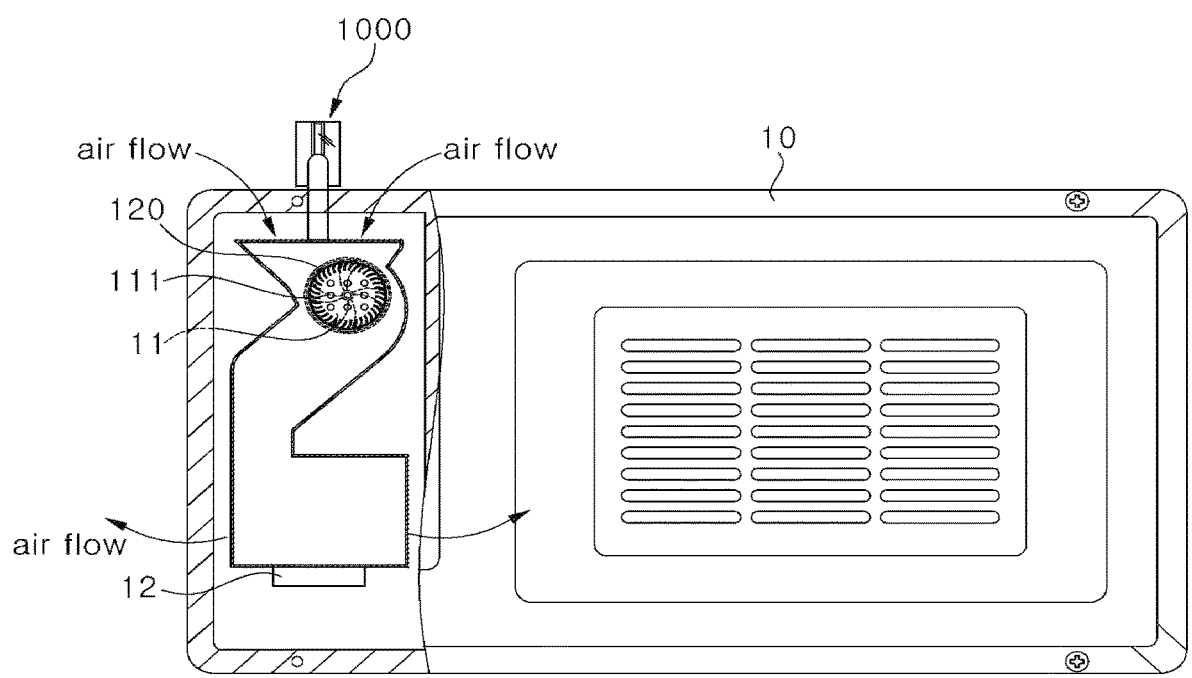

FIG. 18 and FIG. 19 are views of insect traps 1000, 2000, 3000, 4000, 5000 according to embodiments of the present disclosure in use, which have the same configurations as those of the first to sixth embodiments of the present disclosure except that the cross-fan 120 can be operated without using a drive means, such as a motor, provided to the insect trap 1000; 2000; 3000; 4000; 5000.

The insect trap 1000; 2000; 3000; 4000; 5000 is provided with a main body mesh 111 disposed on at least one surface of the main body 110 and allowing air to pass therethrough. The main body mesh 111 may be disposed to adjoin a fan 11, for example, a cooling fan, of a home appliance 10, for example, a microwave oven, a refrigerator, a computer, and the like. Although FIG. 19 shows the structure wherein the main body mesh 111 is disposed in a lateral direction of the cross-fan 120, that is, wherein the insect trap is disposed in the home appliance such that a surface of the main body mesh 111 contacting a rotation axis of the cross-fan 120 adjoins the home appliance fan 11, it should be understood that the present disclosure is not limited thereto. Alternatively, the main body mesh 111 may be disposed in a front direction of the cross-fan 120. That is, the insect trap may be disposed in the home appliance such that a surface of the main body mesh 111 not contacting the rotation axis of the cross-fan 120 or a surface of the main body mesh 111 facing the fan blades of the cross-fan 120 adjoins the home appliance fan 11. In this embodiment, the main body mesh 111 may be disposed in the front direction of the cross-fan 120. For example, in the structure wherein the cross-fan 120 is disposed such that the front direction of the cross-fan 120 faces the front direction of the home appliance fan 11, the cross-fan 120 can be easily operated by the air stream generated by the home appliance fan 11 in view of fluid dynamics. The home appliance 10 may include various members for guiding or securing the insect trap 1000; 2000; 3000; 4000; 5000. For example, the hole appliance 10 may include a mount 12 on which the insect trap 1000; 2000; 3000; 4000; 5000 can be stably seated.

That is, even without using the drive means, such as a motor for operating the cross-fan 120, the cross-fan 120 is rotated by an air stream generated by the home appliance fan 11 to generate an air stream for collecting insects, thereby enabling substantial reduction in power consumption while improving insect collection efficiency by heat generated from the home appliance 10. In addition, air deodorized or purified by the photocatalysis material, carbon dioxide ($CO_2$) generated through photocatalysis reaction of the photocatalysis material and effective in enticement of insects, particularly mosquitoes, or enticement substances generated from an insect enticing agent provided to the insect trap 1000; 2000; 3000; 4000; 5000 can be effectively spread by the air stream generated by the home appliance fan 11, thereby further improving insect collection efficiency.

Next, the present disclosure will be described in more detail with reference to examples. However, it should be noted that these examples are provided for illustration only and should not be construed in any way as limiting the invention.

Experiments 1 to 3 were performed with regard to insecticidal effects of the insecticidal UV LED module of the insect trap according to the embodiments of the present disclosure.

Experiment 1

Detailed conditions of the UV LED are shown as follows and experimental results are shown in Table 1.

Intensity of illumination: 82.6 $\mu W/cm^2$ (at 30 mm), 73.08 $\mu W/cm^2$ (at 70 mm)

Insecticidal UV LED module: wavelength of 275 nm, four UV LED chips mounted thereon Voltage: 16.025 V Current: 0.24 A Light irradiation distance: 70 mm

TABLE 1

| Record time | Elapsed time (second) | Energy (mJ) | Number of exterminated insects | Accumulated number of exterminated insects | Lethality |
|---|---|---|---|---|---|
| 10:01 | 0 | — | 0 | 0 | 0.0 |
| 10:15 | 900 | 65,772 | 3 | 3 | 25.0 |
| 10:34 | 1800 | 131,544 | 0 | 3 | 25.0 |
| 10:45 | 2700 | 197,316 | 0 | 3 | 25.0 |
| 11:01 | 3600 | 263,088 | 0 | 3 | 25.0 |
| 11:15 | 4500 | 328,860 | 2 | 5 | 41.7 |
| 11:30 | 5400 | 394,632 | 0 | 5 | 41.7 |
| 12:15 | 8100 | 591,948 | 0 | 5 | 41.7 |
| 13:00 | 10800 | 789,264 | 0 | 5 | 41.7 |
| 13:30 | 12600 | 920,808 | 0 | 5 | 41.7 |
| 14:00 | 14400 | 1,052,352 | 1 | 6 | 50.0 |
| 16:00 | 21600 | 1,578,528 | 2 | 8 | 66.7 |
| 18:30 | 30600 | 2,236,248 | 2 | 10 | 83.3 |
| 19:00 | 32400 | 2,367,792 | 0 | 10 | 83.3 |

As shown in Table 1, it can be confirmed that a mosquito lethality approaches 50% at an energy of 1 kJ or more.

Experiment 2

Detailed conditions of the UV LED are shown as follows and experimental results are shown in Table 2.

Intensity of illumination 172.2 $\mu W/cm^2$ (at 30 mm), 145.7 $\mu W/cm^2$ (at 70 mm)

Insecticidal UV LED module: wavelength of 275 nm, four UV LED chips mounted thereon Voltage: 16.025 V Current: 0.24 A Light irradiation distance: 70 mm

TABLE 2

| Record time | Elapsed time (second) | Energy (mJ) | Number of exterminated insects | Accumulated number of exterminated insects | Lethality |
|---|---|---|---|---|---|
| 18:12 | 0 | — | 10 | | 0.0 |
| 18:27 | 1500 | 131,130 | 2 | 2 | 6.7 |
| 19:00 | 4500 | 393,390 | 5 | 7 | 23.3 |
| 19:30 | 5100 | 655,650 | 4 | 11 | 36.7 |
| 20:00 | 8100 | 917,910 | 7 | 18 | 60.0 |
| 20:30 | 8700 | 1,180,170 | 3 | 21 | 70.0 |
| 21:00 | 11700 | 1,442,430 | 2 | 23 | 76.7 |

As shown in Table 2, it can be confirmed that a mosquito lethality approaches 50% at an energy of 1 kJ or more.

Experiment 3

Detailed conditions of the UV LED are shown as follows and experimental results are shown in Table 3.

Intensity of illumination 172.2 $\mu W/cm^2$ (at 30 mm), 145.7 $\mu W/cm^2$ (at 70 mm)

Insecticidal UV LED module: wavelength of 275 nm, four UV LED chips mounted thereon Voltage: 16.025 V Current: 0.24 A Light irradiation distance: 70 mm

TABLE 3

| Record time | Elapsed time (second) | Energy (mJ) | Number of exterminated insects | Accumulated number of exterminated insects | Lethality |
|---|---|---|---|---|---|
| 10:50 | 0 | — | 0 | 0 | 0.0 |
| 11:05 | 900 | 131,130 | 0 | 0 | 0.0 |
| 11:20 | 1800 | 393,390 | 0 | 0 | 0.0 |
| 11:35 | 2700 | 393,390 | 2 | 2 | 5.0 |
| 11:50 | 3600 | 524,520 | 7 | 9 | 22.5 |
| 12:05 | 4500 | 655,650 | 7 | 9 | 22.5 |
| 12:20 | 5400 | 786,780 | 7 | 16 | 40.0 |
| 12:35 | 6300 | 917,910 | 2 | 18 | 45.0 |
| 12:50 | 7200 | 1,049,040 | 2 | 20 | 50.0 |
| 13:05 | 10800 | 1,573,560 | 2 | 22 | 55.0 |
| 13:35 | 14400 | 2,098,080 | 1 | 23 | 57.5 |
| 13:50 | 18000 | 2,622,600 | 4 | 27 | 67.5 |
| 14:50 | 21600 | 3,147,120 | 1 | 28 | 70.0 |
| 15:50 | 25200 | 3,671,640 | 4 | 32 | 80.0 |
| 16:50 | 28800 | 4,196,160 |  | 32 | 80.0 |

As shown in Table 3, it can be confirmed that a mosquito lethality approaches 50% at an energy of 1 kJ or more.

Although some embodiments have been described with reference to the accompanying drawings, it should be understood that these embodiments are given by way of illustration only, and that various modifications, variations, and alterations can be made by those skilled in the art without departing from the spirit and scope of the present disclosure. The scope of the present disclosure should be limited only by the accompanying claims and equivalents thereof.

LIST OF REFERENCE NUMERALS

110: main body
111: main body mesh
120: cross-fan
121: cross-fan mesh
130: insect collector
131: insect collector mesh
140: buttress
150: decoy UV LED installation unit
151: decoy UV LED installation unit cap
160: decoy UV LED module
170: insect filter
180: insecticidal UV LED installation unit
161: support substrate
162: UV LED chip
10: home appliance
11: home appliance fan
12: mount

The invention claimed is:

1. An insect trap adapted to entice and collect insects with UV light, comprising:
   a main body having an inlet port defined by a space open at an upper side thereof;
   a cross-fan mounted inside the main body;
   an insect filter detachably coupled to the inlet port to allow selective passage of insects therethrough;
   an insect collector detachably provided to a lower side of the cross-fan and including an insect collector mesh through which air introduced into the main body by the cross-fan is to be discharged; and
   a decoy UV LED installation unit coupled to a buttress above the main body and provided with a decoy UV LED module,
   wherein:
   a cross-section of the main body corresponding to a facet of the cross-fan on which fan blades of the cross-fan move upwards with reference to a rotation direction of the cross-fan defines a first flow channel and a second flow channel extending perpendicularly from the first flow channel to the insect collector, the first flow channel having an inclined shape gradually narrowed downwards from the inlet port and a curved shape extending in an arc shape from a lower end of the inclined shape; and
   the decoy UV LED module has a plate shape and comprises at least one chip-on-board (COB) type UV LED chip or at least one UV LED package mounted on opposite surfaces of a support substrate to emit light in opposite directions of the decoy UV LED module.

2. The insect trap according to claim 1, wherein the second flow channel has a narrower width than the first flow channel.

3. The insect trap according to claim 1, wherein the decoy UV LED module is configured to emit light having a wavelength of 340 nm to 390 nm.

4. The insect trap according to claim 1, wherein the UV LED chips or the UV LED packages are arranged in a plurality of rows.

5. The insect trap according to claim 1, wherein the UV LED chips or the UV LED packages arranged in a zigzag arrangement.

6. The insect trap according to claim 1, wherein
   the UV LED chips or the UV LED packages are arranged on the support substrate such that the UV LED chips or the UV LED packages mounted on one surface of the support substrate do not overlap the UV LED chips or the UV LED packages mounted on the other surface of the support substrate.

7. The insect trap according to claim 1, wherein the decoy UV LED installation unit comprises a material capable of reflecting UV light attached to or coated on a lower surface thereof.

8. The insect trap according to claim 1, wherein the decoy UV LED installation unit is provided on a lower surface thereof with a photocatalyst filter providing a deodorization effect using UV light emitted from the decoy UV LED module as a catalyst.

9. The insect trap according to claim 1, further comprising an insecticidal UV LED installation unit mounted on the insect collector and on which an insecticidal UV LED module is mounted.

10. The insect trap according to claim 9, wherein the insecticidal UV LED module is configured to emit light having a wavelength of 200 nm to 300 nm.

11. An insect trap system comprising:
a home appliance; and
an insect trap configured to emit UV light and provided to a rear surface of the home appliance,
wherein UV light emitted from the insect trap is configured to be radiated toward a lateral side or an upper side of the home appliance.

12. The insect trap system according to claim 11, wherein the insect trap is attached to the rear surface of the home appliance.

13. The insect trap system according to claim 11, wherein the insect trap is separated from the home appliance.

14. An insect trapping method using the insect trap according to claim 1, wherein the cross-fan is operated by an air stream generated by rotation of a home appliance fan provided to the home appliance and insects are enticed by heat generated from the home appliance.

15. The insect trapping method according to claim 14, wherein the home appliance further comprises a mount by which the insect trap is closely disposed on the home appliance.

16. The insect trapping method according to claim 14, wherein the insect trap further comprises a main body mesh formed on at least part of the main body and an air stream generated by rotation of the home appliance fan is configured to pass through the main body mesh to suction insects into the insect trap.

17. An insect trapping method using an insect trap, the insect trap comprising:
a main body;
a main body mesh provided to at least part of the main body;
an insect collector disposed under the main body; and
a decoy UV LED installation unit coupled to a buttress above the main body and having a decoy UV LED module mounted thereon,
wherein insects are enticed by heat generated from a home appliance and are suctioned into the insect collector by an air stream generated by rotation of a home appliance fan provided to the home appliance.

18. The insect trapping method according to claim 17, wherein an air stream generated by rotation of the home appliance fan passes through the main body mesh to suction insects into the insect trap.

19. The insect trapping method according to claim 18, wherein the insect trap further comprises a cross-fan mounted inside the main body and operated by an air stream generated by rotation of the home appliance fan.

20. The insect trapping method according to claim 17, wherein the home appliance further comprises a mount by which the insect trap is closely disposed on the home appliance.

* * * * *